(12) United States Patent
Maehara

(10) Patent No.: US 8,573,370 B2
(45) Date of Patent: Nov. 5, 2013

(54) DISK BRAKE DEVICE

(75) Inventor: Toshifumi Maehara, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 66 days.

(21) Appl. No.: 12/840,413

(22) Filed: Jul. 21, 2010

(65) Prior Publication Data

US 2011/0017553 A1  Jan. 27, 2011

(30) Foreign Application Priority Data

Jul. 22, 2009  (JP) ................. P.2009-170701

(51) Int. Cl.
*F16D 55/08* (2006.01)
*F16D 65/00* (2006.01)

(52) U.S. Cl.
USPC ........................ 188/72.7; 188/71.9

(58) Field of Classification Search
USPC ............. 188/71.7, 71.8, 71.9, 72.7, 72.8
See application file for complete search history.

(56) References Cited

U.S. PATENT DOCUMENTS

| | | | | |
|---|---|---|---|---|
| 3,828,653 A | * | 8/1974 | Aldinger et al. | 91/488 |
| 8,037,974 B2 | * | 10/2011 | Baumgartner | 188/72.2 |
| 2002/0117361 A1 | * | 8/2002 | von Sivers et al. | 188/72.4 |
| 2005/0279592 A1 | * | 12/2005 | Shaw | 188/163 |
| 2008/0156593 A1 | * | 7/2008 | Severinsson et al. | 188/71.9 |
| 2008/0264737 A1 | * | 10/2008 | Baumgartner | 188/72.4 |

FOREIGN PATENT DOCUMENTS

| | | |
|---|---|---|
| JP | 10-252789 | 9/1998 |
| JP | 11-022762 | 1/1999 |
| JP | 11-022764 | 1/1999 |
| JP | 2595545 | 3/1999 |
| JP | 2008-151169 | 7/2008 |

* cited by examiner

*Primary Examiner* — Melody Burch
(74) *Attorney, Agent, or Firm* — Drinker Biddle & Reath LLP

(57) ABSTRACT

A cam housing assembly oscillates in association with rotation of an eccentric cam which is attached to a camshaft and is allowed to press a clutch by cam pins of the cam housing assembly. A pair of piston assemblies are provided of which each includes a piston which can slide within a sleeve, a spindle and a nut which screws on to the spindle and are supported in hole portions in a caliper body so as to oscillate therein, whereby a brake pad is pressed against by a plug after the spindle, the nut and the piston are sequentially pressed by pressing a clutch by the cam pins. Since the spindle and the nut are screwed on to each other through a reversible screw, a gap is adjusted automatically as the pad wears.

2 Claims, 4 Drawing Sheets

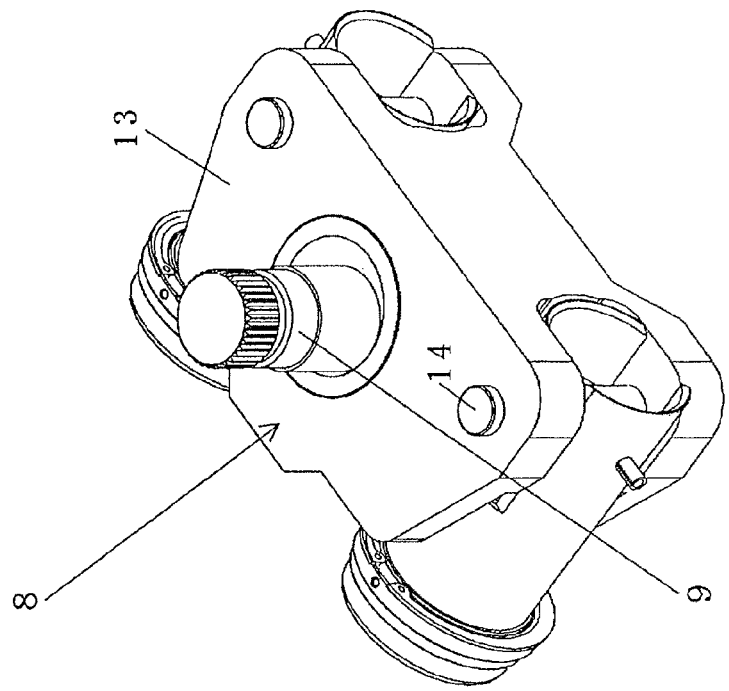
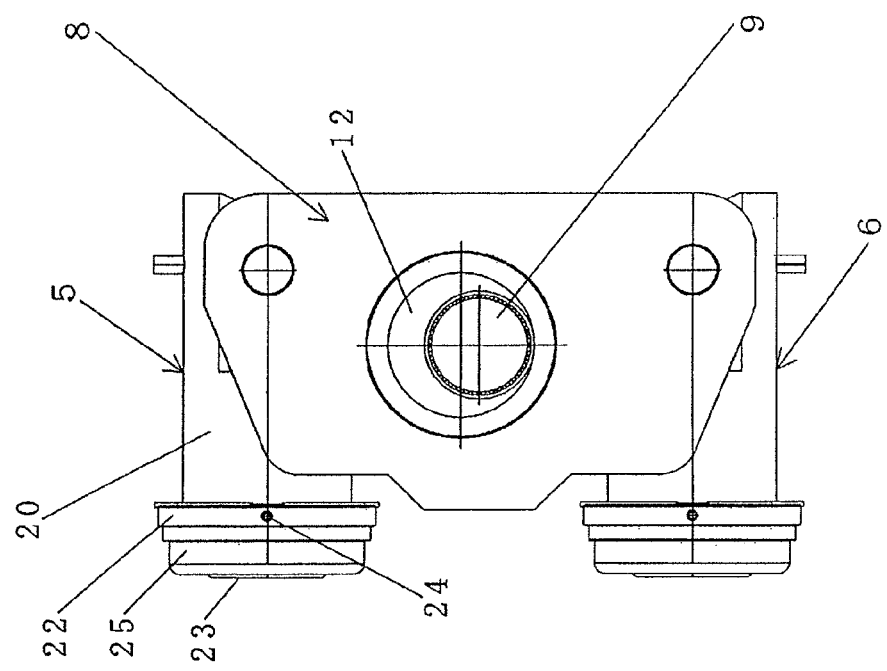
Fig. 3A
Fig. 3B

DISK BRAKE DEVICE

BACKGROUND

The present invention relates to a disk brake device for use in vehicles such as motor vehicles.

Various types of operation force converting mechanisms are used in air disk brakes which are used mainly in commercial vehicles. The characteristics of commercial vehicles require a high-strength configuration for air brakes used therein. There are some air disk brakes which use an eccentric cam mechanism since the eccentric cam mechanism can ensure strength relatively easily.

The eccentric cam mechanism is characterized by a fact that a cam housing does not move in a straight line direction but moves in an oscillating fashion as an eccentric cam rotates. Because of this characteristic, prizing is caused at a pad pressing portion from time to time. Thus, the air brakes have had an inherent problem that their smooth operation is interrupted.

[Patent Document 1] Japanese Patent Publication No. 11-22762 A

[Patent Document 2] Japanese Patent Publication No. 2008-151169 A

[Patent Document 3] Japanese Patent Publication No. 10-252789 A

[Patent Document 4] Japanese Utility Model Registration No. 2595545

[Patent Document 5] Japanese Patent Publication No. 11-22764 A

SUMMARY

An object of the invention is to enable a disk brake device to operate smoothly by providing a mechanism which follows oscillating movements of a cam housing at a piston mechanism portion of a construction in which a pair of piston mechanisms are pressed by an eccentric cam mechanism to thereby eliminate the generation of prizing at a pad pressing portion.

According to a means for solving the problem of the invention, there is adopted a disk brake device comprising:

a caliper body;

a cam housing assembly, accommodated in the caliper body, configured to oscillate by rotation of an eccentric cam attached to a camshaft, and configured to press a clutch by a cam pin of the cam housing assembly; and a pair of piston assemblies accommodated in the caliper body, each of which comprising a piston adapted to slide within a sleeve, a spindle and a nut which is screwed on the spindle, oscillatably supported in a hole portion of the caliper body, the piston assemblies being configured to press a brake pad through sequential pushing of the spindle, the nut and the piston by pushing the clutch by the cam pin.

In addition, the disk brake system described above is characterized in that the nut is screwed on the spindle through a reversible screw so that the spindle is allowed to move forwards while turning when the clutch is not in contact with the spindle. Additionally, the disk brake device is characterized in that a distal end of the piston and the plug are in contact with each other on concave and convex spherical surfaces.

BRIEF DESCRIPTION OF THE DRAWINGS

FIG. 3A is a top view of an assembly drawing of a cam housing assembly and a piston housing assembly of the disk brake device according to the embodiment of the invention.

FIG. 3B is a perspective view of an assembly drawing of a cam housing assembly and a piston housing assembly of the disk brake device according to the embodiment of the invention.

DETAILED DESCRIPTION OF EXEMPLIFIED EMBODIMENTS

Figure 1:
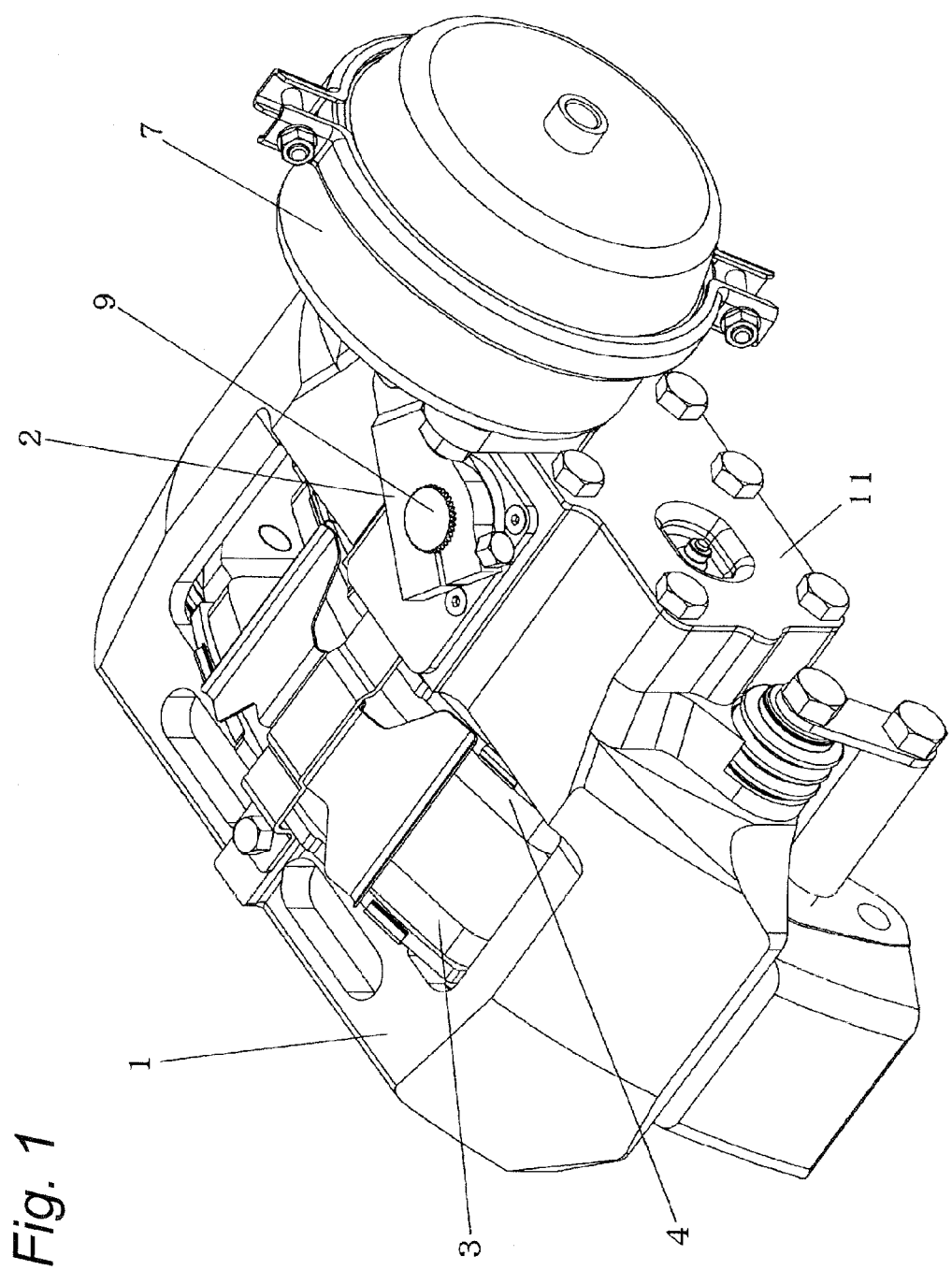
FIG. 1 is a perspective view of a caliper portion of a disk brake device according to an embodiment of the invention.

Hereinafter, an embodiment of the invention will be described by reference to the drawings with reference numerals given to constituent members. In FIG. 1, an outer pad 3 and an inner pad 4, which faces the outer pad 3, are accommodated in a caliper body 1 of a disk brake. Back and forth motion of an air chamber 7 attached to the caliper body 1 is converted into rotational motion of a cam shaft 9 via a link 2. Power of this rotational motion is converted into pressure against the inner pad 4 from a cam housing assembly which is hidden behind the caliper body 1 and a cover assembly 11 to thereby be not shown via a piston assembly which is not shown similarly. The caliper body 1 exhibits a caliper function by the pressure acting on the inner pad 4 so that a rotor, not shown, is pressed by the outer pad 3 and the inner pad 4 therebetween, whereby a brake force is applied.

Figure 2:
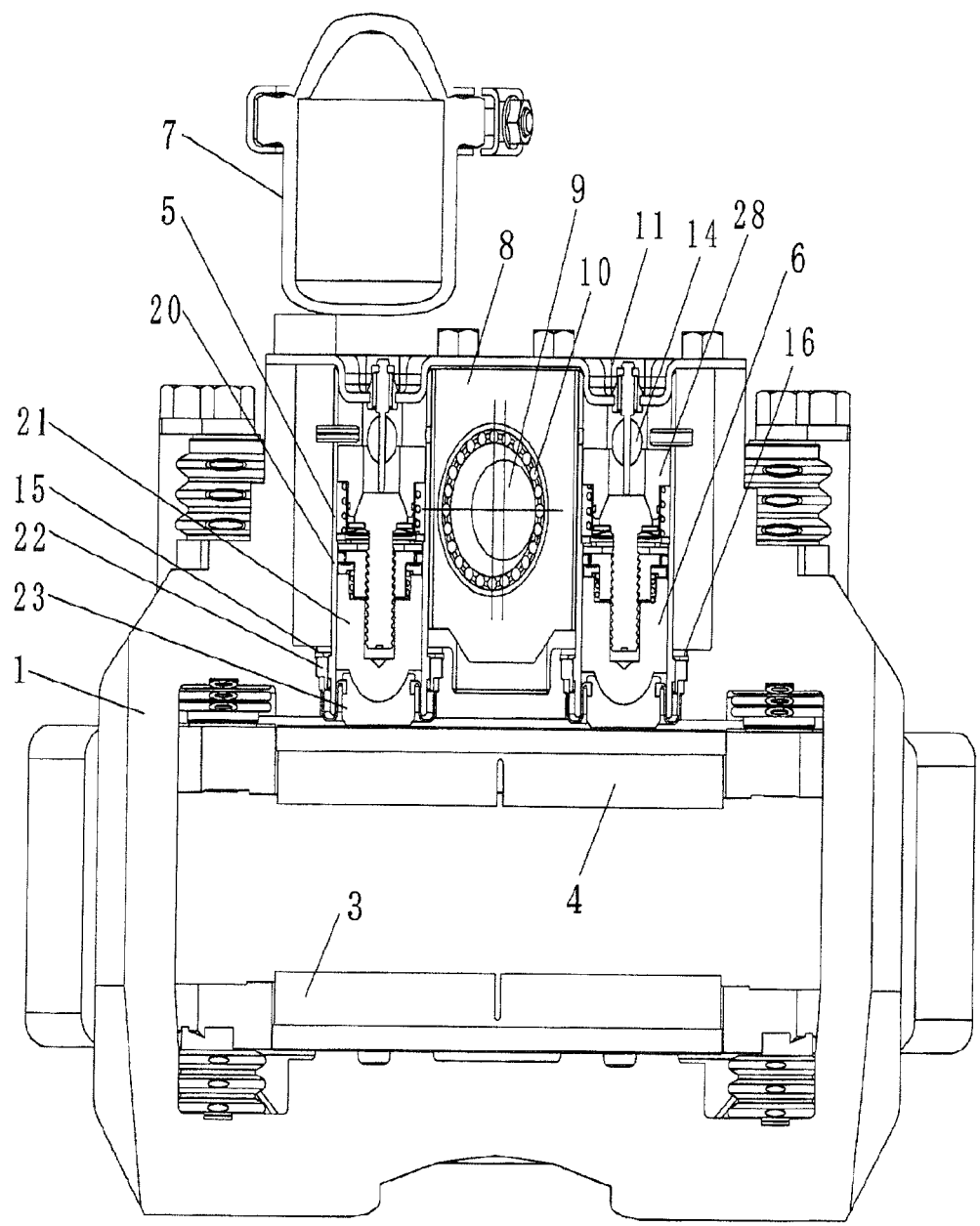
FIG. 2 is a partially sectional top view of the caliper portion of the disk brake device according to the embodiment of the invention.

In FIG. 2, sections of the cam housing assembly 8 and the piston assembly 6, which are not shown in FIG. 1, are drawn. In the cam housing assembly 8, when the camshaft 9 rotates, an eccentric cam 12, which is integrated with the camshaft 9, oscillates, And a cam housing 13 oscillates via a cam bearing 10. Namely, the cam housing assembly 8 has a configuration which is very like to an eccentric cam mechanism. Oscillation of the cam housing assembly 8 is transmitted to a pair of piston assemblies 5, 6 from cam pins 14, which are integrated with the cam housing 13, as back and forth motion. And then, the oscillation of the cam housing assembly 8 is converted into pressure from the pair of piston assemblies 5, 6 to the inner pad 4. The pair of piston assemblies 5, 6 are fitted to be held in groove portions in the caliper body 1 which are provided at a side thereof which lies close to the inner pad 4 by retaining rings 15, 16, respectively, at portions where guide rings 22 are provided.

FIG. 3 shows a mode in which the piston assemblies 5, 6 are combined with the cam housing assembly 8. The cam housing 13 exhibits a substantially trapezoidal shape as viewed from the top and a substantially H-like shape as viewed from the front thereof. The camshaft 9, which is integrated with the eccentric cam 12, is rotatably supported at a trapezoidal upper portion of the cam housing 13 in such a state that the camshaft 9 extends in a vertical direction (in a normal direction to a surface of a sheet of paper on which FIG. 2 is drawn). The cam pins 14, which are made parallel to the camshaft 9, are disposed in left and right space portions of the H-like shape of the cam housing 13 which is exhibited as viewed from the front thereof. The pair of cam pins 14 are integrated with the cam housing 13 at upper and lower ends thereof. Sleeves 20 of the left and right piston assemblies 5, 6 each have a slit-shaped portion which is cut in a front-rear direction (in a vertical direction on the sheet of paper on which FIG. 2 is drawn), and therefore, the pair of piston assemblies 5, 6 can be accommodated in the left and right space portions, respectively, in the cam housing assembly 8. Since the sleeve 20 is brought into contact with the guide ring 22 at a spherical portion, the sleeve 20 can oscillates freely in every direction.

Figure 4:
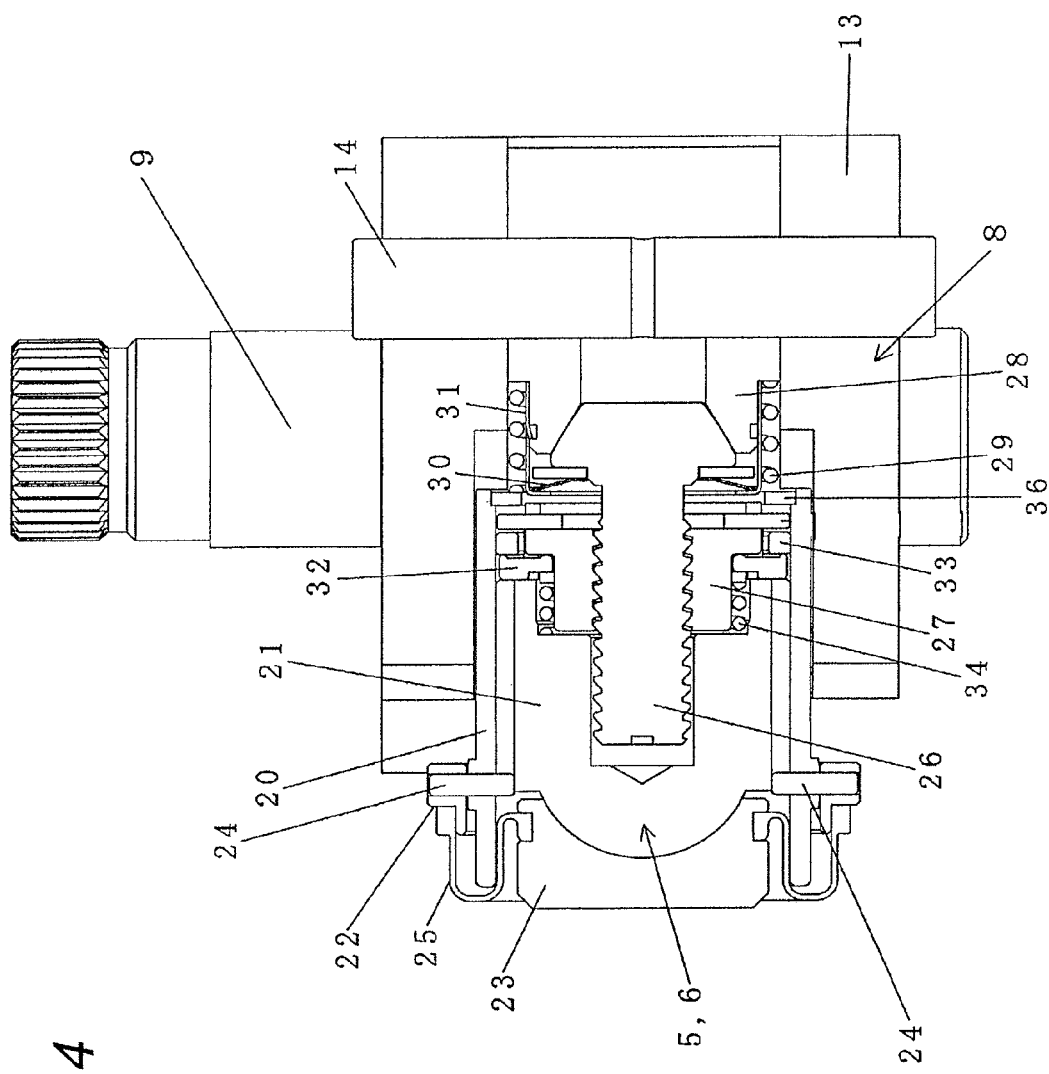
FIG. 4 is a sectional view of the cam housing assembly and the piston housing assembly of the disk brake device according to the embodiment of the invention.

FIG. 4 shows by section a specific combined relationship between the cam housing assembly 8 and the piston assemblies 5, 6. A piston 21 is slidably accommodated in a hollow sleeve 20. A nut 27 is accommodated in a space portion in the piston 21. Levers 32 are disposed at four locations in a circumferential direction between the piston 21 and the nut 27. The lever 32 is configured so as to deflect when force exceeding a predetermined value is applied thereto. A friction ring 33 is intended to generate frictional force. A nut return spring 34 is disposed between the levers 32 and the piston 21. A distal end portion of the piston 21 is formed into a convexly spherical shape and is in contact with a concavely spherical portion of a plug 23. The plug 23 is locked by the guide ring 22 which is attached to the sleeve 20 via a flexible bellofram 25. A pair of oscillation support pins 24 are inserted to penetrate through the guide rings 22 and the sleeves 20. The oscillation support pins 24 are substantially parallel to the cam pins 14. The pair of oscillation support pins 24 are intended to permit the oscillation of the piston assemblies 5, 6 including the sleeves 20.

The nut 27 is screwed on to a spindle 26. The spiral thread relationship between the nut 27 and the spindle 26 is a reversible screw relationship. A swollen portion is provided on the spindle 26. The swollen portion of the spindle 26 faces a cone-shaped portion of a clutch 28. A spring case 31 is fixed to the clutch 28. A coned disk spring 30 is disposed at a bottom portion of the spring case 31 so as to press the swollen portion of the spindle 26 towards the clutch 28. A clutch return spring 29 is incorporated between a clamping member 36 which is attached to the sleeve 20 and the clutch 28. The clutch return spring 29 presses the clutch 28 towards the cam pin 14 which is secured to the cam housing 13.

Next, the operation of the disk brake will be described. Let's assume that rotational motion is given to the camshaft 9 via the link 2 by air pressure in the air chamber 7 to attempt to apply the brake force. The cam housing assembly 8 starts to oscillate forwards (downwards on the sheet of paper on which FIG. 2 is drawn) by the action of the eccentric cam 12 which is integrated with the cam shaft 9. The pair of cam pins 14, which are integrated with the cam housing assembly 8, also oscillate forwards (downwards on the sheet of paper on which FIG. 2 is drawn) to thereby press the clutch 28 forwards.

Hereinafter, to describe the operation of the disk brake by reference particularly to FIG. 4, the cam pin 14 presses the clutch 28 while compressing the clutch return spring 29. The clutch 28 presses the spindle 26 via the swollen portion of the spindle 26. Since the nut 27, which screws on to the spindle 26, is restrained from rotating, the nut 27 is pressed together with the spindle 26. This movement is transmitted to the piston 21 via the levers 32 disposed at the four locations and is further converted into pressure against the inner pad 4 by the plug 23.

Moment is applied to the piston assemblies 5, 6 by the oscillation of the cam housing assembly 8. In the piston assemblies 5, 6, since the sleeves 20 can be tilted about the oscillation support pins 24, a risk is eliminated of prizing being generated in the piston assemblies 5, 6 as a result of the adverse effect of the moment. Further, since a distal end of the piston 21 is in spherical contact with the plug 23, the piston 21 is allowed to oscillate freely in every direction. Consequently, the plug 23 can be in stable contact with the inner pad 4 on a plane thereof which is parallel to the inner pad 4, thereby making it possible to prevent the generation of prizing.

The invention of the subject patent application has an automatic gap adjusting function which is intended to deal with the wear of a brake pad. Let's think of a case in which the brake pad wears with use. In the event that the camshaft 9 is rotated so that the cam housing assembly 8 is returned to a non-braking position when the brake is released, an amount of wear of the pad is represented by an amount of gap between the swollen portion of the spindle 26 and the clutch 28. Then, the contact of the spindle 26 with the cone-shaped portion of the clutch 28 is interrupted, whereby the spindle 26 which is being restrained from moving in its rotational direction is released from the restrained state. On the other hand, axial force is applied to the spindle 26 by the coned disk spring 30 at all times. The spindle 26 and the nut 27 which is restrained from rotating are screwed on to each other by way of the reversible screw relationship. Thus, the spindle 26 moves forwards while turning by biasing force of the coned disk spring 30 and is restrained from moving forwards while turning again at a point in time when the spindle 26 is brought into contact with the clutch 28. The clutch 28 and the spindle 26 are then brought back to their original relationship, whereby the automatic gap adjustment of the brake is completed, there being no concern about insufficient adjustment and over-adjustment.

According to the invention, when the cam housing oscillates to move towards the pad side in association with the operation of the eccentric cam by the rotation of the camshaft 9, the piston assemblies supported in the caliper body are allowed to be tilted about the oscillation support pins disposed in parallel with the camshaft. Because of this, the piston assemblies can follow the movement of the cam housing. Further, the plug which is brought into abutment with the pad and the distal end portion of the piston which is brought into abutment with the plug are in contact with each other on the concavely and convexly spherical surfaces. Thus, the degree of freedom in movement of the piston relative to the plug becomes high, and no prizing is generated at the respective operating portions, thereby making it possible to realize a smooth operation.

With the disk brake device according to the invention, although the eccentric cam is used to effect the braking operation, the generation of prizing at the respective portions which is derived from the oscillating motion which is characteristic thereof is avoided effectively so as to enable the smooth operation of the brake. Thus, the disk brake device of the invention is largely advantageous in realizing the application of the eccentric cam which can ensure strength relatively easily to the brake of a commercial vehicle, in particular, which requires strength. In addition, by incorporating the automatic gap adjustment device which is free from concerns about over-adjustment or insufficient adjustment, the reliability of the disk brake device which utilizes the eccentric cam is increased, and its contribution to the industrial fields can be expected largely.

While the invention has been described in detail by reference to the specific embodiment, it is obvious to those skilled in the art to which the invention pertains that various alterations or modifications can be given to the invention without departing from the spirit, scope and intention thereof.

The invention is based on Japanese Patent Application (No. 2009-170701) filed on Jul. 22, 2009, the contents of which are to be incorporated herein by reference.

What is claimed is:

1. A disk brake device comprising:
 a caliper body;
 a cam housing assembly, accommodated in the caliper body, configured to oscillate by rotation of an eccentric cam attached to a camshaft, and configured to press a clutch by a cam pin of the cam housing assembly; and a pair of piston assemblies accommodated in the caliper body, each of which comprising a piston adapted to slide within a sleeve, a plug being in contact with the distal end of the piston, a spindle and a nut which is screwed on the spindle, wherein the distal end of the piston and the plug are in contact with each other on concave and convex spherical surfaces so that each of the piston assemblies is oscillatably supported in a hole portion of the caliper body, wherein the piston assemblies are configured to press a brake pad through sequential pushing of the spindle, the nut and the piston by pushing the clutch by the cam pin, and wherein each of the piston assemblies is oscillatably supported by an oscillation support pin which is parallel to the cam pin and which is inserted through the sleeve and through a guide ring attached to the sleeve, so that the sleeve is adapted to be tilted with respect to the oscillation support pin.

2. The disk brake device as set forth in claim 1, wherein the nut is screwed on to the spindle through a reversible screw so that the spindle is allowed to move forwards while turning when the clutch is not in contact with the spindle.

* * * * *